United States Patent
Tondu et al.

(10) Patent No.: US 10,906,626 B2
(45) Date of Patent: Feb. 2, 2021

(54) HEATING GLAZING WITH THINNED OUTER SHEET OF GLASS AND HEATING LAYER WITH FLOW SEPARATION LINES

(71) Applicant: SAINT-GOBAIN GLASS FRANCE, Courbevoie (FR)

(72) Inventors: Thomas Tondu, Sully (FR); Pierre Chaussade, Orleans (FR); Vincent Legois, Germigny des Pres (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 305 days.

(21) Appl. No.: 15/738,757

(22) PCT Filed: Jun. 30, 2016

(86) PCT No.: PCT/FR2016/051652
§ 371 (c)(1),
(2) Date: Dec. 21, 2017

(87) PCT Pub. No.: WO2017/001792
PCT Pub. Date: Jan. 5, 2017

(65) Prior Publication Data
US 2018/0208293 A1    Jul. 26, 2018

(30) Foreign Application Priority Data

Jul. 2, 2015  (FR) ...................... 15 56269

(51) Int. Cl.
*B64C 1/14*     (2006.01)
*B32B 17/10*    (2006.01)
*H05B 3/86*     (2006.01)
*B32B 7/12*     (2006.01)
*B64D 15/12*    (2006.01)

(52) U.S. Cl.
CPC .............. *B64C 1/1484* (2013.01); *B32B 7/12* (2013.01); *B32B 17/1077* (2013.01);
(Continued)

(58) Field of Classification Search
CPC .......... B64C 1/1484; B64C 1/14; B32B 7/12; B32B 17/10174; B32B 17/10183;
(Continued)

(56) References Cited

U.S. PATENT DOCUMENTS 2,806,118 A * 9/1957 Peterson ............ G05D 23/2453
                                                    219/203
2,878,357 A * 3/1959 Thomson .......... B32B 17/10192
                                                    338/292

(Continued)

FOREIGN PATENT DOCUMENTS

EP    0 353 141 A1    1/1990
EP    0 893 938 A1    1/1999
(Continued)

OTHER PUBLICATIONS

International Search Report as issued in International Patent Application No. PCT/FR2016/051652, dated Sep. 30, 2016.

Primary Examiner — David P Angwin
Assistant Examiner — Bob Zadeh
(74) Attorney, Agent, or Firm — Pillsbury Winthrop Shaw Pittman LLP

(57) ABSTRACT

A laminated glazing includes a first structural ply assembled with a first glass sheet of 0.5 to 1.5 mm thickness by way of a first adhesive interlayer, the first glass sheet forming a first exterior face of the laminated glazing, the face of the first glass sheet oriented toward the first adhesive interlayer bearing a first conductive heating layer of 2 Ångströms to 500 nm thickness, and the first conductive heating layer including flow-separating lines of 0.05 to 0.2 mm thickness spaced apart by 8 to 20 mm.

16 Claims, 4 Drawing Sheets

(52) U.S. Cl.
CPC .. *B32B 17/10174* (2013.01); *B32B 17/10183* (2013.01); *B32B 17/10192* (2013.01); *B32B 17/10211* (2013.01); *B32B 17/10788* (2013.01); *B64D 15/12* (2013.01); *H05B 3/86* (2013.01); *B32B 2250/05* (2013.01); *B32B 2305/345* (2013.01); *B32B 2307/202* (2013.01); *B32B 2311/04* (2013.01); *B32B 2315/08* (2013.01); *B32B 2333/12* (2013.01); *B32B 2369/00* (2013.01); *B32B 2605/006* (2013.01); *B32B 2605/18* (2013.01)

(58) Field of Classification Search
CPC ......... B32B 17/10192; B32B 17/10211; B32B 17/1077; B32B 17/10788; B32B 2250/05; B32B 2305/345; B32B 2307/202; B32B 2311/04; B32B 2315/08; B32B 2333/12; B32B 2369/00; B32B 2605/006; B32B 2605/18; B32B 17/10761; B64D 15/12; H05B 3/86; E03F 7/12; F16L 55/30; F16L 55/40
See application file for complete search history.

(56) References Cited

U.S. PATENT DOCUMENTS

| | | | | |
|---|---|---|---|---|
| 3,414,445 A | * | 12/1968 | Orcutt | B32B 17/02 156/106 |
| 3,930,452 A | * | 1/1976 | Van Laethem | B32B 17/10045 109/80 |
| 3,974,359 A | * | 8/1976 | Orcutt | B32B 17/10036 219/522 |
| 4,078,107 A | * | 3/1978 | Bitterice | B32B 17/10018 428/38 |
| 6,034,353 A | * | 3/2000 | Demeester | B32B 17/10045 219/203 |
| 7,964,821 B2 | * | 6/2011 | Veerasamy | H05B 3/84 219/203 |
| 8,383,994 B2 | * | 2/2013 | Rashid | B32B 17/10009 219/507 |
| 8,471,177 B2 | * | 6/2013 | Chaussade | B32B 17/10045 219/203 |
| 10,485,061 B2 | * | 11/2019 | Klein | H05B 3/86 |
| 2003/0087048 A1 | * | 5/2003 | Chaussade | B64C 1/1492 428/34 |
| 2008/0318011 A1 | | 12/2008 | Chaussade et al. | |
| 2011/0198334 A1 | | 8/2011 | Zagdoun et al. | |
| 2013/0092676 A1 | * | 4/2013 | Offermann | B32B 17/10036 219/203 |
| 2016/0174295 A1 | * | 6/2016 | Klein | H05B 3/84 219/203 |
| 2018/0208293 A1 | * | 7/2018 | Tondu | B32B 17/10174 |

FOREIGN PATENT DOCUMENTS

| WO | WO 2012/004280 A1 | 1/2012 |
|---|---|---|
| WO | WO 2015/014511 A1 | 2/2015 |

* cited by examiner

Influence of the thickness of the exterior glass on the optimal setpoint temperature

HEATING GLAZING WITH THINNED OUTER SHEET OF GLASS AND HEATING LAYER WITH FLOW SEPARATION LINES

CROSS-REFERENCE TO RELATED APPLICATIONS

This application is the U.S. National Stage of PCT/FR2016/051652, filed Jun. 30, 2016, which in turn claims priority to French patent application number 1556269 filed Jul. 2, 2015. The content of these applications are incorporated herein by reference in their entireties.

The present invention relates to heated (anti-frost function) glazings using a conductive layer, and in particular to glazings of this type intended for aeronautics (airplanes and helicopters).

Heated aeronautic glazings are laminates of two or three organic or glass plies. Frost may be prevented from appearing on aeronautic glazings via joule heating achieved by means of a transparent and electrically conductive layer. The heating layer is deposited with sheet-resistance nonuniformities in order to limit the nonuniformity in the power delivered to each unit of area (it is only known how to uniformly heat rectangles). Typically, the heating layer is deposited on a 3 mm-thick piece of glass. The heating is regulated by means of a temperature probe that measures a temperature representative of the average temperature of the heating layer.

The heating-layer carriers currently used, which carriers are typically made of glass that is 3 mm thick because they are conventionally made of semi-tempered glass (it is impossible to thermally temper very thin pieces of glass), often mean that excessive heating is required because the thickness of the glass greatly degrades the information on the actual temperature of the external skin of the glazing, which must be maintained above 0° C. Moreover, the zone most subject to frost is that to which the least power is delivered (assuming an equal flux of supercooled water droplets, which freeze on contact with glass at below 0° C.) and it is for this zone that the heating system must be dimensioned. In the zones that are better heated, power consumption is therefore needlessly high.

The main objective of the invention is therefore to decrease the power required by a heated glazing to guarantee the absence of frost formation over its entire area.

To this end, one subject of the invention is a laminated glazing comprising a structural ply assembled with a first glass sheet of 0.5 to 1.5 mm thickness by way of a first adhesive interlayer, characterized in that said first glass sheet forms a first exterior face of the laminated glazing, in that the face of said first glass sheet oriented toward said first adhesive interlayer bears a first conductive heating layer of 2 Ångströms to 500 nm thickness, and in that said first conductive heating layer comprises flow-separating lines of 0.05 to 0.2 mm thickness spaced apart by 8 to 20 mm, said lines being formed by etching in order to guide current between two current feed strips placed along two opposite edges of the glazing.

The expression "structural ply" is understood, in the context of the present invention, to mean a transparent sheet that is thick enough to ensure a desired mechanical strength, and that moreover will be described in more detail below. The laminated glazing of the invention includes one or more, and in particular three or more, thereof.

To form said first glass sheet, sheets of aluminosilicate glass matrix are available on the market in thicknesses as small as less than 1 mm; this glass may be chemically (and not thermally) toughened and thus mechanically strong heating plies may be achieved, in particular on front-side glazing faces. The use of a thin glass allows the setpoint temperature to be decreased, this having many advantages:

- a lower power consumption in frost-free flight phases, and on the ground when the available power is limited;
- lower thermomechanical stresses and therefore greater reliability;
- a shorter defrosting time on the ground;
- a substantial decrease in the risk of local overheating by switch-on surge on the ground under cold conditions.

The use of a glazing comprising flow-separating lines (also called flow lines) allows more uniform heating to be achieved, this:

- decreasing overall electrical power for a given amount of power delivered to the coldest point;
- allowing the specifications of the electrical generators to be decreased;
- decreasing the temperature of the hottest zones, these possibly ageing the glazing;
- allowing the temperature probes to be more easily positioned; and
- substantially decreasing the risk of local overheating by switch-on surge on the ground under cold conditions.

Thus, by means of the technical measures of the invention, the total power consumption of a glazing making it possible to ensure no frost forms on any of its area may be decreased while considerably improving heating uniformity.

According to other preferred features of the laminated glazing of the invention:

- it comprises a second structural ply assembled with the first by way of a second adhesive interlayer;
- it comprises a second glass sheet of 0.5 to 1.5 mm thickness assembled with said first structural ply or said second structural ply by way of a third adhesive interlayer;
- said second glass sheet forms a second exterior face of the laminated glazing, and the face of said second glass sheet oriented toward said third adhesive interlayer bears a second conductive heating layer of 2 Ångströms to 500 nm thickness;
- said second conductive heating layer comprises flow-separating lines of 0.05 to 0.2 mm thickness, said lines being spaced apart by 8 to 20 mm;
- said first structural ply and said second structural ply each consist, independently of each other, of a glass sheet of thickness comprised between 4 and 10 mm or of a polymer of thickness comprised between 5 and 20 mm; it is recommended to limit the weight of the laminated glazing, in particular when it is intended for a transport vehicle: when all the structural plies are made of polymer, for example, the sum of the thicknesses of all the structural plies does not exceed 30 mm;
- said first structural ply and said second structural ply each consist, independently of each other, of a chemically toughened or semi-thermally-tempered glass sheet, or of polymethyl methacrylate (PMMA) or of polycarbonate (PC);
- said first glass sheet of 0.5 to 1.5 mm thickness and said second glass sheet of 0.5 to 1.5 mm thickness are chemically toughened;
- said first adhesive interlayer, said second adhesive interlayer and said third adhesive interlayer consist, independently of one another, of a layer of polyvinyl butyral (PVB), polyurethane (PU) or ethylene vinyl acetate (EVA) of 0.5 to 20 and preferably 1 to 16 mm thickness;

said first conductive heating layer and said second conductive heating layer consist, independently of each other, of a layer of a conductive oxide such as tin-doped indium oxide (ITO), fluorine-doped tin oxide ($SnO_2$:F) or aluminum-doped zinc oxide (AZO) of 20 to 500 nm thickness, or of a layer of a metal such as gold of 2 to 100 Ångströms thickness;

the flow-separating lines are arranged in substantially parallel lines that connect substantially orthogonally to their two respective current feed strips and that have curvatures or inflections when said two facing strips or portions of said two strips make an angle to each other or one another; this configuration increases the degree of temperature uniformity over the entire area of the heated laminated glazing: a coldspot or cold spots are avoided and/or the difference between hot and cold spots is decreased;

said first conductive heating layer or said second conductive heating layer has a thickness gradient; it is a question of procuring differences in electrical resistance over the entire area of the conductive heating layer, here again with the aim of increasing temperature uniformity over the entire area of the heated glazing under cold conditions.

Other subjects of the invention are:

the use of the laminated glazing described above as a helicopter or airplane cockpit glazing;

such a use as an anti-frost glazing; the term "anti-frost" designates the function of preventing the formation of frost on the exterior face of the laminated glazing, on the exterior-atmosphere side; the glass sheet forming this face then bears a conductive heating layer according to the invention;

such a use as an antifog glazing; here this means either the fact of preventing the formation of fog (an actual antifog function) or indeed of making fog disappear (defogging function) from the exterior face of the laminated glazing, on the interior-side of the vehicle; the glass sheet forming this face then bears a conductive heating layer according to the invention.

The invention will be better understood in light of the description of the appended drawings, in which:

FIG. 1 shows curves of optimal setpoint temperature as a function of the ratio of the heating power at the cold point to the heating power at the point of regulation, this ratio being designated $K_c$, for various thicknesses of the glass sheet making contact with the exterior atmosphere of the laminated glazing;

FIGS. 2a, 2b, and 2c are schematic representations of a known heated laminated glazing and two embodiments of a glazing unit according to the invention.

Figure 1:
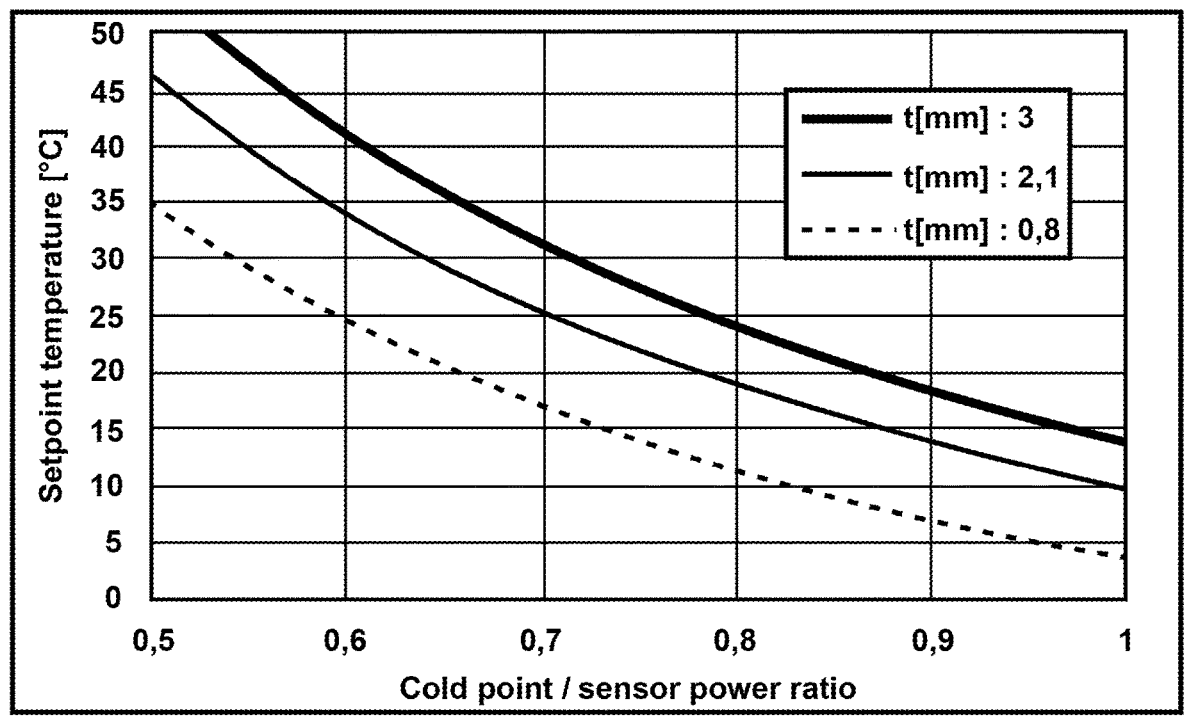

With reference to FIG. 1, it may be seen that, for each of the thicknesses of the exterior glass sheet, the more uniform the temperature of the heated glazing is over its entire area, i.e. the closer the ratio of the heating powers at the cold point/sensor is to 1, the lower the optimal setpoint temperature (measured at the sensor).

Essentially, the thinner the exterior glass sheet, the lower the optimal setpoint temperature. For a ratio $K_c$ of powers at the cold point/sensor of 0.7, the optimal setpoint temperature decreases from 31° C. for an exterior glass sheet of 3 mm thickness to an optimal setpoint temperature of 17° C. for an exterior glass sheet of 0.8 mm thickness.

The curves in FIG. 1 were obtained from calculations that were based on assumptions vis-à-vis convection and the collection of water on the glazing, assumptions that of course were the same for all three curves in the figure.

Figure 2A:
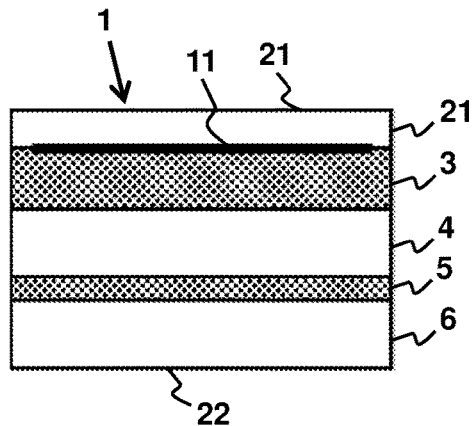
Figure 2B:
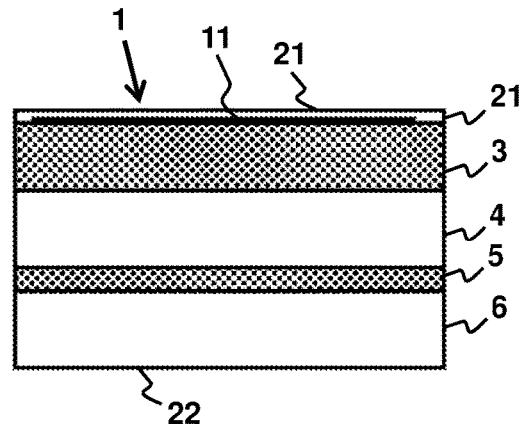
Figure 2C:
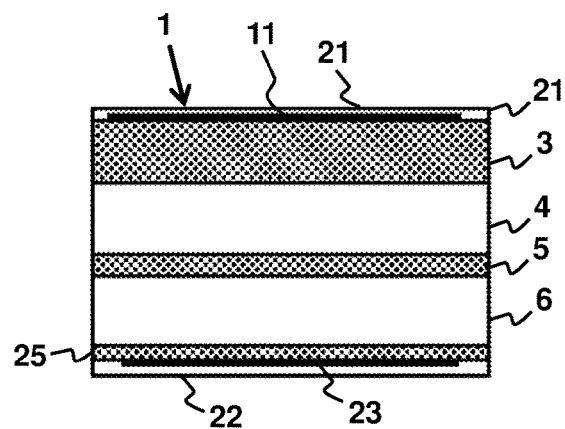

FIGS. 2a and 2b show two aircraft-windshield glazing configurations in cross section, the configuration in FIG. 2a being a conventional configuration and the configuration in FIG. 2b being a "thin-glass" configuration.

Each of the two laminated glazings 1 comprises first and second structural plies 4, 6, each formed from a fully thermally tempered (compressive surface stress of about 150 MPa) or chemically toughened soda-lime-silica glass sheet of 8 mm thickness. The glass is not necessarily soda-lime-silica glass, and may be aluminosilicate or lithium aluminosilicate glass, etc. The plies 4, 6 are adhesively bonded by a layer 5 of polyvinyl butyral of 2 mm thickness. The ply 6 forms the exterior face 22 of the laminated glazing 1, on the cabin-interior side.

A semi-thermally tempered or chemically toughened glass sheet 2 of 3 mm thickness (case of FIG. 2a), or a chemically toughened glass sheet of 0.8 mm thickness (case of FIG. 2b), is adhesively bonded to the first structural ply 4 by way of a polyvinyl butyral layer 3 of 8 mm thickness. The glass sheet 2 forms the exterior face 21 of the laminated glazing 1, on the cabin-exterior side. The face of the glass sheet 2 oriented toward the interior of the laminate bears a conductive heating layer 11 of tin-doped indium oxide (ITO) of 200 nm thickness, optionally comprising, depending on the sample, flow-separating lines of 0.08 mm thickness spaced apart by 10 mm, said lines being formed by laser etching.

In an embodiment, the laminated glazing includes a second glass sheet forming the second exterior face 22 of the laminated glazing and having a second conductive heating layer 23 assembled with the first structural ply 4 or the second structural ply 6 by way of a third adhesive interlayer 25. The second conductive heating layer 23 is on a side of the second glass sheet oriented towards the third adhesive interlayer 25.

The presence or absence of flow-separating lines 26 or flow lines allows different heating power uniformities to be obtained, these uniformities being characterized by the ration of the power delivered by the current feed strips 28 to the coldest zone of the glazing to the power delivered level with the regulating probe: 0.6 without flow lines and 0.8 with flow lines, in the present case.

The electrical power consumption of the glazing as a function of ambient temperature was then calculated under the convective conditions of flight under dry conditions (150 $W/m^2/°$ C.). It is assumed here that the probe is representative of the average power of the glazing.

For these calculations, the setpoint temperature was adapted to the glazing.

Figure 3A:
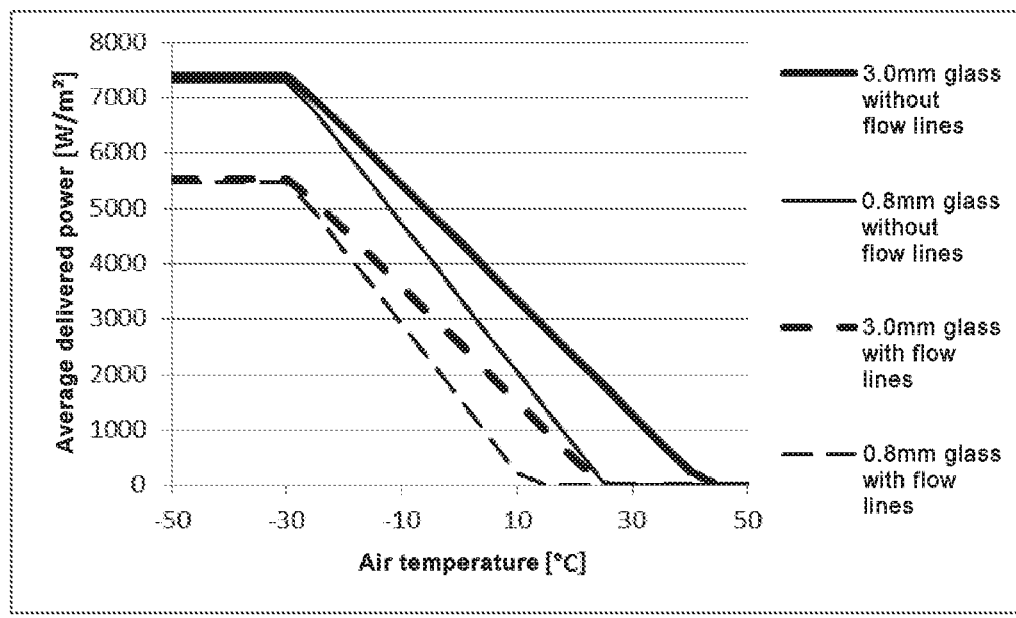
FIGS. 3a and 3b are curves of heating power and of the decrease in heating power, respectively, for various configurations of the laminated glazing.
Figure 3B:
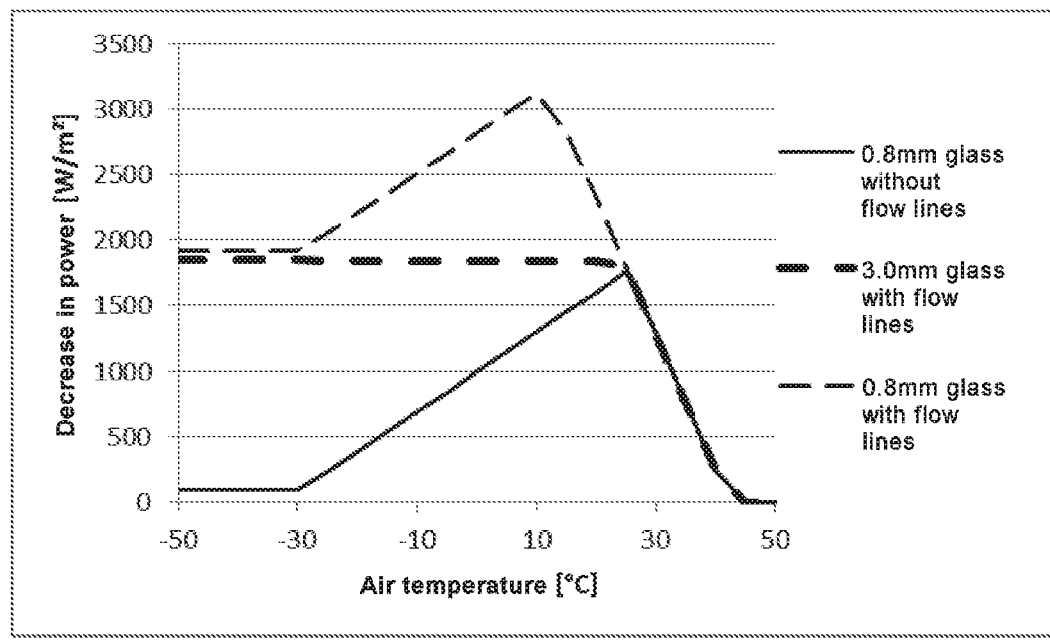
Figure 4:
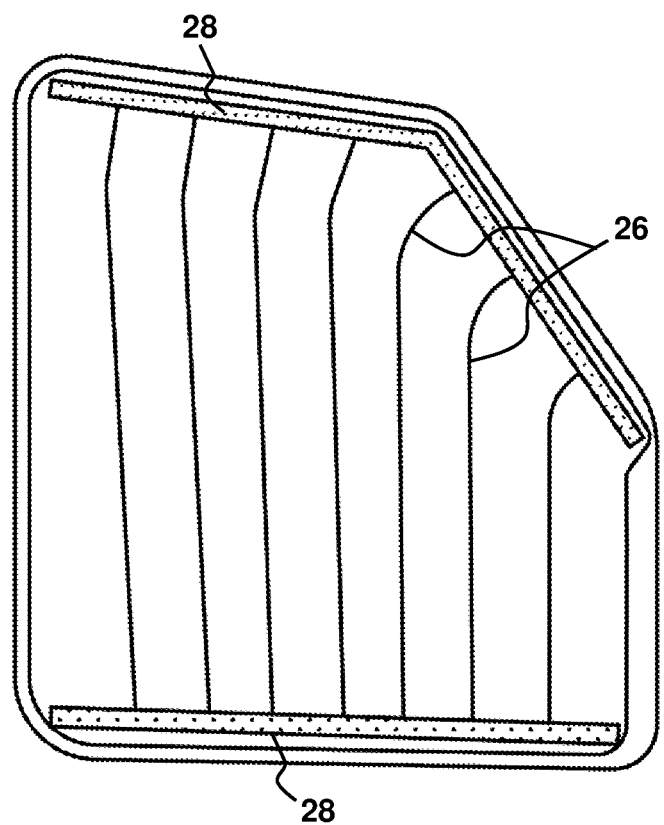
FIG. 4 is a top plan view of a glazing in accordance with an embodiment.

The results are given in the form of curves in FIGS. 3a and 3b, which are equivalent and which show that, with respect to the glazing with the relatively thick glass of FIG. 2a without flow lines, the decrease in the average delivered power (in $W/m^2$) increases for the respective solutions in which:

the glass is 0.8 mm thick (FIG. 2b) and flow lines are absent;

the glass is 3 mm thick (FIG. 2a) and flow lines are present;

the glass is 0.8 mm thick and flow lines are present.

The improvement is particularly great for helicopters, which frequently encounter flight conditions between −10° C. and 30° C.

The constant portion of the two assembly configurations shown in FIGS. 2a and 2b may be replaced by one ply or two plies of PMMA or PC of total thickness typically of 5 to 30 mm. These small thicknesses rather correspond to helicopter applications. Two structural plies made of polymer may be adhesively bonded to each other by a layer of polyurethane.

The invention claimed is:

1. A laminated glazing comprising a first structural ply assembled with a first glass sheet of 0.5 to 1.5 mm thickness by way of a first adhesive interlayer, wherein said first glass sheet forms a first exterior face of the laminated glazing, intended to be in contact with exterior atmosphere and being chemically toughened, wherein a face of said first glass sheet oriented toward said first adhesive interlayer bears a first conductive heating layer of 2 Ångströms to 500 nm thickness, and wherein said first conductive heating layer comprises flow-separating lines of 0.05 to 0.2 mm thickness spaced apart by 8 to 20 mm, said lines being formed by etching in order to guide current between two current feed strips placed along two opposite edges of the glazing wherein the first structural ply is a sheet selected from the group consisting of a second glass sheet of thickness between 4 and 10 mm, a polymer sheet of thickness between 4 and 10 mm, and a polymer sheet of between 5 and 20 mm, and the first intermediate adhesive layer is a layer selected from the group consisting of a layer of polyvinyl butyral (PVB), polyurethane (PU), and poly(ethylene vinyl acetate) (EVA) having a thickness between 0.5 and 20 mm, and
a second structural ply assembled with the first structural ply by way of a second adhesive interlayer; and
a second glass sheet of 0.5 to 1.5 mm thickness assembled with said first structural ply or said second structural ply by way of a third adhesive interlayer.

2. The laminated glazing as claimed in claim 1, wherein said second glass sheet forms a second exterior face of the laminated glazing, and wherein a face of said second glass sheet oriented toward said third adhesive interlayer bears a second conductive heating layer of 2 Ångströms to 500 nm thickness.

3. The laminated glazing as claimed in claim 2, wherein said second conductive heating layer comprises flow-separating lines of 0.05 to 0.2 mm thickness, said lines being spaced apart by 8 to 20 mm.

4. The laminated glazing as claimed in claim 2, wherein said first conductive heating layer and said second conductive heating layer consist, independently of each other, of a layer of a conductive oxide of 20 to 500 nm thickness, or of a layer of a metal of 2 to 100 Ångströms thickness.

5. The laminated glazing as claimed in claim 4, wherein said conductive oxide is tin-doped indium oxide (ITO), fluorine-doped tin oxide ($SnO_2$:F) or aluminum-doped zinc oxide (AZO), and said metal is gold.

6. The laminated glazing as claimed in claim 3, wherein the flow-separating lines are arranged in substantially parallel lines that connect substantially orthogonally to two current feed strips and that have curvatures or inflections when said two facing strips or portions of said two strips make an angle to each other or one another.

7. The laminated glazing as claimed in claim 2, wherein said first conductive heating layer or said second conductive heating layer has a thickness gradient.

8. The laminated glazing as claimed in claim 1, wherein said first structural ply and said second structural ply each consist, independently of each other, of a glass sheet of thickness comprised between 4 and 10 mm or of a polymer of thickness comprised between 5 and 20 mm.

9. The laminated glazing as claimed in claim 8, wherein said first structural ply and said second structural ply each consist, independently of each other, of a chemically toughened or semi-thermally-tempered glass sheet, or of polymethyl methacrylate (PMMA) or of polycarbonate (PC).

10. The laminated glazing as claimed in claim 1, wherein said second glass sheet of 0.5 to 1.5 mm thickness is chemically toughened.

11. The laminated glazing as claimed in claim 1, wherein said first adhesive interlayer, said second adhesive interlayer and said third adhesive interlayer consist, independently of one another, of a layer of polyvinyl butyral (PVB), polyurethane (PU) or ethylene vinyl acetate (EVA) of 0.5 to 20 mm thickness.

12. The laminated glazing as claimed in claim 11, wherein said first adhesive interlayer, said second adhesive interlayer and said third adhesive interlayer consist, independently of one another, of a layer of polyvinyl butyral (PVB), polyurethane (PU) or ethylene vinyl acetate (EVA) of 1 to 16 mm thickness.

13. A method comprising utilizing a laminated glazing as claimed in claim 1 as a helicopter or airplane cockpit glazing.

14. The method as claimed in claim 13, wherein the laminated glazing is utilized as an anti-frost glazing.

15. The method as claimed in claim 13, wherein the laminated glazing is utilized as an antifog glazing.

16. The laminated glazing as claimed in claim 1, wherein the first conductive heating layer consists of a metal of 2 to 100 Ångströms thickness.

* * * * *